US011865839B2

(12) United States Patent
Yamada

(10) Patent No.: US 11,865,839 B2
(45) Date of Patent: Jan. 9, 2024

(54) NOZZLE PLATE NOZZLE PLATE MANUFACTURING METHOD AND INKJET HEAD

(71) Applicant: KONICA MINOLTA, INC., Tokyo (JP)

(72) Inventor: Akihisa Yamada, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 4 days.

(21) Appl. No.: 17/631,715

(22) PCT Filed: Jul. 30, 2019

(86) PCT No.: PCT/JP2019/029871

§ 371 (c)(1),
(2) Date: Jan. 31, 2022

(87) PCT Pub. No.: WO2021/019693

PCT Pub. Date: Feb. 4, 2021

(65) Prior Publication Data

US 2022/0266595 A1 Aug. 25, 2022

(51) Int. Cl.
*B41J 2/14* (2006.01)
*B41J 2/16* (2006.01)

(52) U.S. Cl.
CPC ............. *B41J 2/1433* (2013.01); *B41J 2/162* (2013.01); *B41J 2/164* (2013.01)

(58) Field of Classification Search
CPC ........... B41J 2/1433; B41J 2/162; B41J 2/164
See application file for complete search history.

(56) References Cited

U.S. PATENT DOCUMENTS

2004/0075707 A1* 4/2004 Shin ........................ B41J 2/1628 347/18
2011/0261112 A1* 10/2011 Okamura ............. B41J 2/14233 427/535
2014/0307030 A1* 10/2014 Uchiyama .............. B41J 2/1645 347/47
2018/0281425 A1* 10/2018 Chen ...................... B41J 2/1603

FOREIGN PATENT DOCUMENTS

JP 4088544 B2 5/2008

OTHER PUBLICATIONS

CNIPA The First Office Action for corresponding CN Application No. 201980098753.1; dated Nov. 18, 2022.
PCT International Preliminary Report on Patentability with Written Opinion of the International Searching Authority for International Application No. PCT/JP2019/029871; dated Feb. 1, 2022.
International Search Report for International Application No. PCT/JP2019/029871; dated Sep. 17, 2019.
EPO Extended European Search Report for corresponding EP Application No. 19939552.6; dated Jul. 6, 2022.

* cited by examiner

*Primary Examiner* — Jason S Uhlenhake
(74) *Attorney, Agent, or Firm* — CANTOR COLBURN LLP

(57) ABSTRACT

A nozzle plate includes, on a substrate: at least a base layer; an intermediate layer; and a liquid repellent layer. The base layer contains a silane coupling agent A having reactive functional groups at both terminals and including a hydrocarbon chain and a benzene ring at an intermediate part. The intermediate layer contains an inorganic oxide. The liquid repellent layer contains a fluorine (F)-containing coupling agent B.

10 Claims, 2 Drawing Sheets

NOZZLE PLATE NOZZLE PLATE MANUFACTURING METHOD AND INKJET HEAD

CROSS REFERENCE TO RELATED APPLICATIONS

This is the U.S. national stage of application No. PCT/JP2019/029871, filed on Jul. 30, 2019. Priority is claimed and the disclosure of which is also incorporated herein by reference.

TECHNICAL FIELD

The present invention relates to a nozzle plate, a nozzle plate manufacturing method, and an inkjet head. More specifically, the present invention relates to a nozzle plate exhibiting excellent liquid abrasion resistance, alkali ink resistance, liquid repellency on the surface of the nozzle plate when ink is jetted; a manufacturing method for the nozzle plate; and an inkjet head provided with the nozzle plate.

BACKGROUND ART

The inkjet recording apparatus, which is widely used at present, holds an inkjet head having a nozzle plate in which a plurality of nozzle holes are formed in rows in a frame by attaching it to a frame, and ejects ink from the plurality of nozzles toward the recording medium in a state of minute droplets, thereby forming an image on the recording medium.

As a typical ink ejection method for an inkjet head, there are a method in which water in ink is vaporized and expanded by heat generated by passing a current through an electric resistor disposed in a pressurizing chamber to discharge by applying pressure to ink, and a method in which a part of a flow passage member constituting a pressurizing chamber is made to be a piezoelectric body, or a piezoelectric body is installed in a flow passage member, and a piezoelectric body corresponding to a plurality of nozzle holes is selectively driven, so that a pressurizing chamber is deformed based on the dynamic pressure of each piezoelectric body to discharge liquid from the nozzle.

In inkjet heads, the surface characteristics of the surface on which nozzles are provided have become very important in realizing good ejection performance of ink droplets.

When ink droplets or dust adhere to the vicinity of the nozzle hole of the inkjet head, the ejection direction of the ink droplets to be ejected is bent, or the ejection angle of the ink droplets at the nozzle hole is expanded, resulting in the occurrence of satellites.

Further, problems such as a minute decrease in the ink ejection amount or no nozzle ejection (also referred to as nozzle missing) occur due to clogging of the nozzle hole. Also, when the adhered ink covers the entire surface of the nozzle hole, it becomes impossible to eject the ink. These lead to serious problems that significantly reduce the resolution and quality of the image to be formed.

In order to stably eject straight ink droplets, it is of course necessary to optimize the design in the flow path and the method for applying pressure to the ink, but this is not enough. It is necessary to always maintain a stable surface condition around the nozzle hole for ejecting the ink further at all times. For this purpose, a method for giving a liquid repellent layer having liquid repellency to prevent unnecessary ink from adhering to and remaining in the periphery of the nozzle hole of the ink discharge surface of the nozzle plate has been examined.

Generally, a silicone-based compound or a fluorine-containing organic compound, for example, a silane coupling agent or the like is used for the liquid repellent film formed on the nozzle surface of the nozzle plate included in the inkjet head.

It is known that a liquid repellent layer having good adhesion can be formed by using a silane coupling agent for forming the liquid repellent layer. However, when the density of the hydroxy group of the substrate or the base layer constituting the nozzle plate is low, the alkaline component constituting the ink destroys the hydrogen bond or the hydroxy group bond present in the substrate or the base layer to break the bond, and thus there is a problem in that the liquid repellent layer has low alkali resistance.

To solve the above problem, as a forming method for a liquid repellent film, there is disclosed a manufacturing method for a liquid repellent film having high alkali resistance which comprises mixing a silane coupling agent having reactive functional groups at both terminals and having a hydrocarbon chain and a benzene ring at an intermediate part, a fluorine-containing silane coupling agent, and a silane coupling agent having a fluorocarbon chain at one terminal and a reactive functional group at the other terminal in the same layer and forming a high-density polymerized film by a dehydration condensation reaction, whereby a hydrophobic benzene ring, alkyl chain and fluorine carbon chain are present in the vicinity of a siloxane bond as a crosslinking point (for example, see Patent Literature 1).

However, in the constitution proposed in Patent Literature 1, a phenomenon has been confirmed that the durability against the alkali component is still insufficient, and that, when the pigment ink is used, the liquid repellent film surface gradually wears due to abrasion between the wiping material used during maintenance and the pigment ink containing the pigment particles, and it has been found that there is a problem that the durability (abrasion resistance) cannot be ensured only by maintenance when such an operation is repeated over a long period of time.

CITATION LIST

Patent Literature

PATENT LITERATURE 1: Japanese Patent No. 4088544

SUMMARY OF THE INVENTION

Problems to be Solved by the Invention

The present invention has been made in view of the above problems and situations, and an object thereof is to provide a nozzle plate exhibiting excellent abrasion resistance, alkali ink resistance, liquid repellency on the surface of the nozzle plate; a manufacturing method for the nozzle plate; and an inkjet head provided with the nozzle plate.

Means for Solving the Problems

As a result of intensive studies in view of the above problems, the present inventors have found that a nozzle plate exhibiting excellent abrasion resistance, alkali ink resistance, liquid repellency on the surface of the nozzle plate when ink is jetted or the like can be achieved by a nozzle plate having a specific configuration in which are formed, on a substrate, a base layer containing a silane coupling agent containing a benzene ring, an intermediate layer constituted by an inorganic oxide, and a liquid repellent layer containing a fluorine (F)-containing coupling agent on the outermost surface layer.

That is, the above problems according to the present invention are solved by the following means.

1. A nozzle plate comprising, on a substrate: at least a base layer; an intermediate layer; and a liquid repellent layer,
   wherein the base layer contains a silane coupling agent A having reactive functional groups at both terminals and including a hydrocarbon chain and a benzene ring at an intermediate part;
   the intermediate layer contains an inorganic oxide; and
   the liquid repellent layer contains a fluorine (F)-containing coupling agent B.

2. The nozzle plate according to item 1, wherein the silane coupling agent A contained in the base layer is a compound having a structure represented by the following general formula (1):

$$X_sQ_{3-s}Si(CH_2)_tC_6H_4(CH_2)_uSiR_{3-m}X_m \quad \text{General formula (1)}$$

wherein Q and R each represent a methyl group or an ethyl group, t and u each represent a natural number of 1 to 10, and s and m each represent a natural number of 1 to 3; when s is 1 and m is 1, two Q and two R are present, and the two Q and R each have the same structure or different structures; $C_6H_4$ is a phenylene group; and X represents an alkoxy group, chlorine, an acyloxy group or an amino group.

3. The nozzle plate according to item 1 or 2, wherein the inorganic oxide contained in the intermediate layer is an inorganic oxide containing carbon (C), silicon (Si), and oxygen (O) as main components.

4. The nozzle plate according to item 3, wherein the inorganic oxide containing carbon (C), silicon (Si), and oxygen (O) as main components and forming the intermediate layer is a silane compound or a silane coupling agent C having a molecular weight of 300 or less.

5. The nozzle plate according to any one of items 1 to 4, wherein the substrate is a metal and a surface of the metal has a passivation film.

6. The nozzle plate according to any one of items 1 to 5, wherein the metal constituting the substrate is stainless steel.

7. The nozzle plate according to any one of items 1 to 6, wherein when a film thickness of the base layer is defined as t (μm) and a maximum height in surface roughness of the substrate is defined as Rz (μm), a condition defined by the following formula (1) is satisfied:

$$Rz \leq t \quad \text{Formula (1)}$$

8. A nozzle plate manufacturing method for manufacturing the nozzle plate according to any one of items 1 to 7, comprising:
   forming the nozzle plate by forming at least a base layer, an intermediate layer, and a liquid repellent layer on a substrate,
   wherein the base layer is formed by using a silane coupling agent A having reactive functional groups at both terminals and including a hydrocarbon chain and a benzene ring at an intermediate part;
   the intermediate layer is formed of an inorganic oxide; and
   the liquid repellent layer is formed by using a fluorine (F)-containing coupling agent B.

9. The nozzle plate manufacturing method according to item 8, wherein a passivation treatment is performed on a surface of the substrate to form a passivation film.

10. The nozzle plate manufacturing method according to item 9, wherein a film thickness of the passivation film is in a range of 10 to 100 nm.

11. An inkjet head comprising the nozzle plate according to any one of items 1 to 7.

Effects of Invention

According to the present invention, it is possible to provide a nozzle plate exhibiting excellent abrasion resistance, alkali ink resistance, liquid repellency on the surface of the nozzle plate when ink is jetted and the like.

The expression mechanism or action mechanism of the effect of the present invention is inferred as follows.

In the present invention, the base layer, the intermediate layer, and the liquid repellent layer that constitute the nozzle plate are constituted as specified in the present invention, so that the silane coupling agents having reactive functional groups on both terminals and including a hydrocarbon chain and a benzene ring at an intermediate part added to the base layer polymerize densely and produce stacking interactions with each other, whereby the adhesion a the metal substrate is particularly improved, and when the nozzle plate is subjected to stress, particularly in the thickness direction, the adhesion between the substrate of the nozzle plate and the constituent layers provided thereon can be improved, and the resistance when the surface of the nozzle plate is subjected to stress in the width direction by a wiping material or the like used during maintenance can be improved. Further, it has been found that by providing the intermediate layer, the coupling agent in the liquid repellent layer can be efficiently oriented on the surface and can be densely filled on the flat surface, and it is possible to realize excellent liquid repellency, as well as alkali durability and to ensure durability against long-term repeated maintenance using pigment ink.

DESCRIPTION OF EMBODIMENTS

Figure 1:
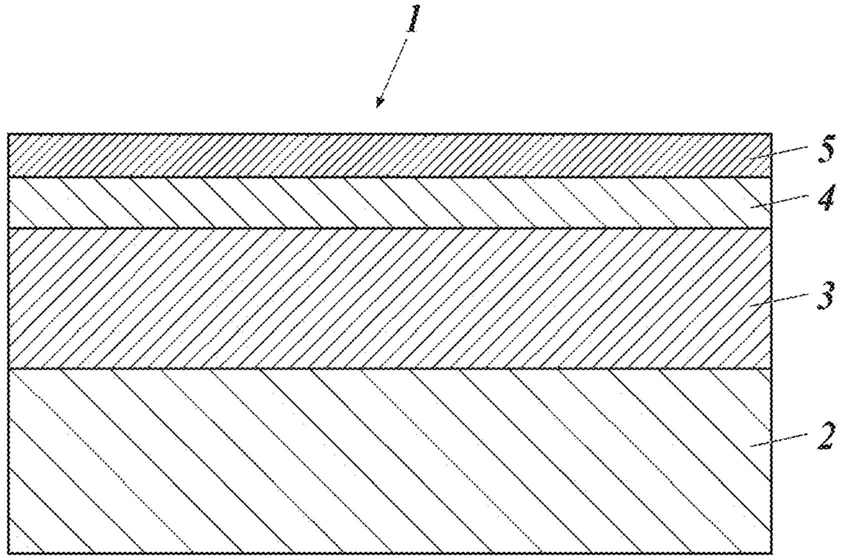
FIG. 1 is a schematic cross-sectional view showing an example of a constitution of a nozzle plate of the present invention (Embodiment 1).

An inkjet plate according to the present invention comprises a nozzle plate having, on a substrate, at least a base layer, an intermediate layer, and a liquid repellent layer, wherein the base layer contains a silane coupling agent A having reactive functional groups at both terminals and including a hydrocarbon chain and a benzene ring at an intermediate part, that the intermediate layer contains an inorganic oxide, and that the liquid repellent layer contains a fluorine (F)-containing coupling agent B. This feature is a technical feature common to the present invention according to each of the following embodiments.

In an embodiment of the present invention, the silane coupling agent A contained in the base layer is preferably a compound having a structure represented by the general formula (1) in terms of further improving the adhesion to the substrate and the durability against an alkaline ink, from the viewpoint of further exhibiting the effects intended by the present invention.

Further, it is preferable that the inorganic oxide contained in the intermediate layer is an inorganic oxide containing carbon (C), silicon (Si), and oxygen (O) as main components, and further that the inorganic oxide containing carbon (C), silicon (Si), and oxygen (O) as main components is a silane compound or a silane coupling agent C having a molecular weight of 300 or less, in terms of exhibiting the effect of retaining the fluorine (F)-containing coupling agent contained in the upper liquid repellent layer and further improving the adhesion between the liquid repellent layer and the intermediate layer.

Further, it is preferable that the substrate is a metal and a surface of the metal has a passivation film in terms of further improving the adhesion to the base layer.

Further, it is preferable that the metal constituting the substrate is stainless steel in that more excellent durability can be exhibited.

Further, it is preferable that when the film thickness of the base layer is defined as t (μm) and the maximum height of the substrate is defined as Rz (μm), $Rz \leq t$ is satisfied in that the base layer enters the uneven portion of the substrate surface, the effect as an anchor is exhibited, and the adhesion is further improved.

It is preferable that the film thickness of the oxide film is in the range of 10 to 100 nm in that the objective effect of the present invention can be further exhibited.

A nozzle plate manufacturing method of the present invention includes forming the nozzle plate by forming at least a base layer, an intermediate layer, and a liquid repellent layer on a substrate, wherein the base layer is formed by using a silane coupling agent A having reactive functional groups at both terminals and including a hydrocarbon chain and a benzene ring at an intermediate part, the intermediate layer is formed of an inorganic oxide, and the liquid repellent layer is formed by using a fluorine (F)-containing coupling agent B.

Further, in the nozzle plate manufacturing method of the present invention, it is preferable that a passivation treatment is performed on a surface of the substrate to form a passivation film, and the film thickness of the passivation film to be formed is in the range of 10 to 10 nm.

Hereinafter, the present invention and the constitution elements thereof, as well as embodiments and aspects to carry out the present invention, will be detailed in the following. In the present description, when two figures are used to indicate a range of value before and after "to", these figures are included in the range as a lower limit value and an upper limit value.

<<Nozzle Plate>>

A nozzle plate of the present invention has, on a substrate, at least 1) a base layer containing a silane coupling agent A having reactive functional groups at both terminals and including a hydrocarbon chain and a benzene ring at an intermediate part,
2) an intermediate layer containing an inorganic oxide, and
3) a liquid repellent layer containing a fluorine (F)-containing coupling agent B.

Hereinafter, the details of the nozzle plate of the present invention will be described.

[Basic Constitution of Nozzle Plate]

First, a specific constitution of the nozzle plate according to the present invention will be described with reference to the drawings. Incidentally, in the description of each numeral, the numbers described in parentheses at the end of the constitution element represents symbols in each figure.

FIG. 1 is a schematic cross-sectional view showing an example of a nozzle plate having a constitution defined in the present invention (Embodiment 1).

As shown in FIG. 1, in a basic constitution of the nozzle plate 1 of the present invention, a base layer 3 containing a silane coupling agent A having reactive functional groups at both terminals and including a hydrocarbon chain and a benzene ring at an intermediate part is provided adjacent to a substrate 2, an intermediate layer 4 containing an inorganic oxide is further provided adjacent to the base layer 3, and a liquid repellent layer 5 containing a fluorine (F)-containing coupling agent B is further provided thereon.

Figure 2:
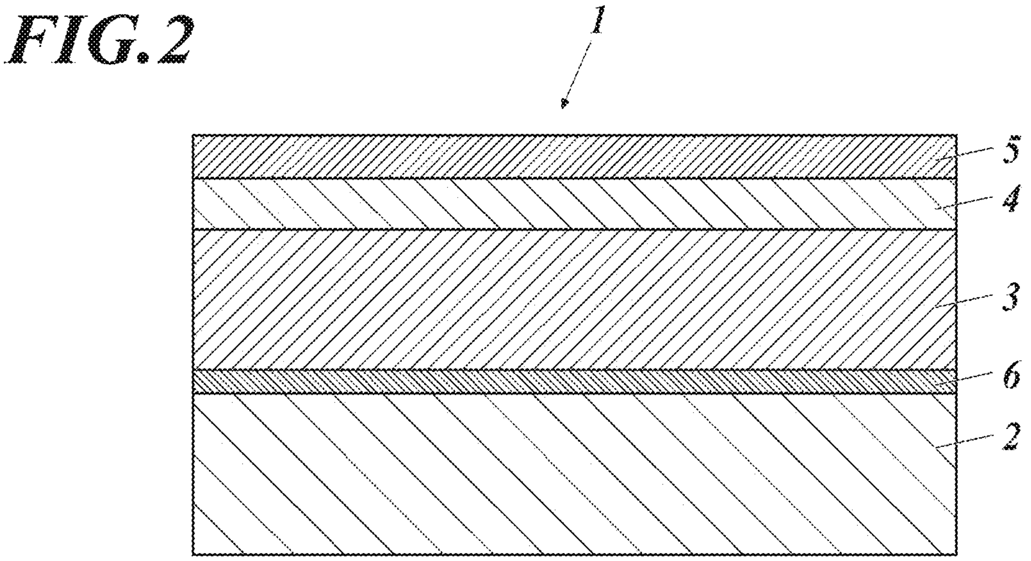
FIG. 2 is a schematic cross-sectional view showing another example of a constitution of a nozzle plate of the present invention (Embodiment 2).

FIG. 2 is a schematic cross-sectional view showing Embodiment 2, which is another example of a nozzle plate according to the present invention.

The nozzle plate 1 shown in FIG. 2 has a constitution in which a passivation film 6 is further provided on the surface of the substrate 2 in addition to the constitution of the nozzle plate shown in FIG. 1, and such a constitution is preferable in that the adhesion between the substrate 2 and the base layer 3, for example, the adhesion when tensile stress is applied in the thickness direction can be further improved.

[Each Constituent Material of Nozzle Plate]

Next, the substrate 2, the base layer 3, the intermediate layer 4, the liquid repellent layer 5, and the passivation film 6 on the surface of the surface constituting the nozzle plate of the present invention will be described in detail.

(Substrate)

The substrate 2 constituting the nozzle plate may be selected from materials having high mechanical strength, ink resistance, and excellent dimensional stability, for example, various materials such as inorganic materials, metal materials, and resin films. Examples of the resin film include polyester resins such as polyethylene terephthalate (PET) and polyethylene naphthalate (PEN), and synthetic resins such as polyimide resins, aromatic polyamide resins, and polysulfone resins.

Examples of the inorganic material and the metal material include metal materials such as iron (for example, stainless steel (SUS)), aluminum, nickel, and stainless steel, and glass.

In the present invention, among them, the substrate is preferably metal, and more preferably stainless steel (SUS).

The thickness of the substrate constituting the nozzle plate is in the range of 10 to 500 μm, preferably in the range of 50 to 150 μm.

Further, the maximum height Rz of the substrate constituting the nozzle plate is in the range of 0.8 nm to 400 μm, preferably in the range of 4 to 150 nm.

The maximum height Rz (μm) of the substrate referred to in the present invention can be determined by measurement according to the method in conformity with JIS B 0601-2001, and specifically refers to the maximum value in micrometers (μm) obtained by extracting a reference length in the direction of the average line from a roughness curve, measuring the distance between the summit line and the valley line of the extracted portion in the direction of the longitudinal magnification of the roughness curve.

<Surface Treatment of Substrate>

Further, in a metal substrate suitable as a substrate applied to the present invention, it is preferable that the metal surface has a passivation film in terms of improving corrosion resistance and adhesion to the base layer.

It is preferable to form a passivation film on the surface of the metal substrate, for example, stainless steel, in terms of improving the adhesion to the base layer. As for the forming method for the passivation film, conventional known methods can be selected and applied as appropriate, for example, the passivation treatment method.

Passivation film formation as used in the present invention is a method of immersing a metal material in a treatment liquid such as nitric acid to form a passivation film on the surface, and refers to a state in which an oxide film resistant to corrosive action is produced on the metal surface. This passivation film is used to protect the metal inside from corrosion because it does not dissolve when exposed to solutions or acids.

In general, it often refers to a passivation treatment for stainless steel, and the treatment method is determined in detail by the MIL standard and the ASTM standard of the United States, and reference can be made thereto; for example, material of the SUS 300 series is subjected to the passivation treatment using a solution of the nitric acid based solution and the material of the SUS 400 series is subjected to the passivation treatment using a solution of the nitric acid-chromic acid based solution. In the present invention, the thickness of the passivation film is preferably in the range of 10 to 100 nm.

The passivation treatment is not a treatment for adding a film to the surface as in plating, but a treatment for increasing the thickness of a passivation film unique to stainless steel, and involves almost no dimensional change.

(Base Layer)

The base layer constituting the nozzle plate of the present invention contains a silane coupling agent A having reactive functional groups at both terminals and including a hydrocarbon chain and a benzene ring at an intermediate part, as a constituent component.

There is no particular limitation on the silane coupling agent A applicable to the base layer, and a compound satisfying the above requirements known in the art can be appropriately selected and used, but from the viewpoint that the objective effect of the present invention can be fully exhibited, it is preferable that the silane coupling agent A is a compound having an alkoxy group, chlorine, acyloxy group, or amino group as reactive functional groups at both terminals and a structure including a hydrocarbon chain and a benzene ring (phenylene group) at an intermediate part, which is represented by the following general formula (1).

<Compound Having Structure Represented by General Formula (1)>

$$X_sQ_{3-s}Si(CH_2)_tC_6H_4(CH_2)_uSiR_{3-m}X_m \quad \text{General formula (1)}$$

In the general formula (1), Q and R each represent a methyl group or an ethyl group. t and u each represent a natural number of 1 to 10. s and m each represent a natural number of 1 to 3. When s is 1 and m is 1, two Q and two R are present, and the two Q and R each have the same structure or different structures. $C_6H_4$ is a phenylene group. X represents an alkoxy group, a chlorine, an acyloxy group, or an amino group.

The alkoxy group is, for example, an alkoxy group having 1 to 12 carbon atoms such as a methoxy group, an ethoxy group, a propoxy group, or a butoxy group, preferably an alkoxy group having 1 to 8 carbon atoms, more preferably an alkoxy group having 1 to 6 carbon atoms.

Examples of the acyloxy group include linear or branched acyloxy groups having 2 to 19 carbon atoms (for example, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, octylcarbonyloxy, tetradecylcarbonyloxy, and octadecylcarbonyloxy).

Examples of the amino group include an amino group ($—NH_2$) and a substituted amino group having 1 to 15 carbon atoms (for example, methylamino, dimethylamino, ethylamino, methylethylamino, diethylamino, n-propylamino, methyl-n-propylamino, ethyl-n-propylamino, n-propylamino, isopropylamino, isopropylamino, isopropylmethylamino, isopropylethylamino, diisopropylamino, phenylamino, diphenylamino, methylphenylamino, ethylphenylamino, n-propylphenylamino, and isopropylphenylamino).

Exemplary compounds having a structure represented by the general formula (1) according to the present invention are listed below, but the present invention is not limited to these exemplary compounds.

1) 1,4-bis(trimethoxysilylethyl)benzene
2) 1,4-bis(triethoxysilylethyl)benzene
3) 1,4-bis(trimethoxysilylbutyl)benzene
4) 1,4-bis(triethoxysilylbutyl)benzene
5) 1,4-bis(trimethylaminosilylethyl)benzene
6) 1,4-bis(triethylaminosilylethyl)benzene
7) 1,4-bis(trimethylaminosilylbutyl)benzene
7) 1,4-bis(triacetoxysilylethyl)benzene
8) 1,4-bis(trichloromethylsilylethyl)benzene
9) 1,4-bis(trichloromethylsilylmethyl)benzene The compound having the structure represented by the general formula (1) according to the present invention can be synthesized and obtained according to a conventionally known synthetic method. These can also be obtained as a commercial product.

<Forming Method for Base Layer>

The base layer according to the present invention is formed by dissolving the silane coupling agent A having reactive functional groups at both terminals and including a hydrocarbon chain and a benzene ring at an intermediate part according to the present invention in an organic solvent such as ethanol, propanol, butanol, or 2,2,2-trifluoroethanol at a desired concentration to prepare a coating liquid for forming a base layer, and then applying the coating liquid onto a substrate by a wet coating method and drying the coating liquid.

The concentration of the silane coupling agent A in the coating liquid for forming a base layer is not particularly limited, but is generally in the range of 0.5 to 50% by mass, and preferably in the range of 1.0 to 30% by mass.

The layer thickness of the base layer according to the present invention is not particularly limited, but when the maximum height of the substrate is Rz (μm), the thickness t (μm) of the base layer preferably satisfies a condition $Rz \leq t$ in terms of acting as a buffer layer for the roughness of the substrate, and is preferably in the range of about 1 to 500 nm, more preferably in the range of 5 to 150 nm.

(Intermediate Layer)

The intermediate layer according to the present invention contains at least an inorganic oxide.

In general, examples of the inorganic oxide include aluminum oxide, silica (silicon dioxide), magnesium oxide, zinc oxide, lead oxide, tin oxide, tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide, and vanadium oxide, and the inorganic oxide applied to the intermediate layer according to the present invention is preferably silicon dioxide or titanium oxide, and more preferably silicon dioxide.

In the present invention, when the inorganic oxide contained in the intermediate layer is silicon dioxide, the intermediate layer is preferably a layer containing carbon (C), silicon (Si), and oxygen (O) as main components, and the intermediate layer as a layer containing carbon (C), silicon (Si), and oxygen (O) as main components is preferably formed using a silane compound having a molecular weight of 300 or less (for example, alkoxysilane or silazane) or a silane coupling agent C.

Further, in the intermediate layer according to the present invention, the compound constituting the layer containing carbon (C), silicon (Si), and oxygen (O) as main components may be the silane coupling agent A applied in the base layer.

Examples of the alkoxysilane, silazane or silane coupling agent having a molecular weight of 300 or less which can be applied to the present invention are shown below, but the present invention is not limited to these compounds. The numerical value described in parentheses after each compound is the molecular weight (Mw).

Examples of the alkoxysilane include tetraethoxysilane ($Si(OC_2H_5)_4$, Mw: 208.3), methyltriethoxysilane ($CH_3Si(OC_2H_5)_3$, Mw: 178.3), methyltrimethoxysilane ($CH_3Si(OCH_3)_3$, Mw: 136.2), dimethyldiethoxysilane ($(CH_3)_2Si(OC_2H_5)_2$, Mw: 148.3), and dimethyldimethoxysilane ($(CH_3)_2Si(OCH_3)_2$, Mw: 120.2).

Further, examples of the silazane include 1,1,1,3,3,3-hexamethyldisilazane ($(CH_3)_3SiNHSi(CH_3)_3$, 161.4), 1,1,1,3,3,3-hexaethyldisilazane ($(C_2H_5)_3SiNHSi(C_2H_5)_3$, 245.4), other compounds such as 1,3-bis (chloromethyl)tetramethyldisilazane and 1,3-divinyl-1,1,3,3-tetramethyldisilazane.

Further, examples of the silane coupling agent include:

1) vinyl-based silane coupling agents: vinyltrimethoxysilane ($CH_2{=}CHSi(OCH_3)_3$, Mw: 148.2), vinyltriethoxysilane ($CH_2{=}CHSi(OC_2H_5)_3$, Mw: 190.3), other compounds such as $CH_2{=}CHSi(CH_3)(OCH_3)_2$. $CH_2{=}CHCOO(CH_2)_2Si(OCH_3)_3$, $CH_2{=}CHCOO(CH_2)_2Si(CH_3)Cl_2$, $CH_2{=}CHCOO(CH_2)_3SiCl_3$, and $CH_2{=}C(CH_3)Si(OC_2H_5)_3$;
2) amino-based silane coupling agents: 3-aminopropyltrimethoxysilane ($H_2NCH_2CH_2CH_2Si(OCH_3)_3$, mW: 179.3), 3-(2-aminoethylamino)propyltrimethoxysilane ($H_2NCH_2CH_2NHCH_2CH_2CH_2Si(OCH_3)_3$, Mw: 222.4), 3-(2-aminoethylamino)propylmethyldimethoxysilane ($H_2NCH_2CH_2NHCH_2CH_2CH_2Si(CH_3)(OCH_3)_2$, Mw: 206.4); and
3) epoxy-based silane coupling agents: 3-glycidoxypropyltrimethoxysilane (Mw: 236.3) and 3-glycidoxypropyltriethoxysilane (Mw: 278.4).

<Forming Method for Intermediate Layer>

The intermediate layer according to the present invention is formed by dissolving the silane compound having a molecular weight of 300 or less, for example, alkoxysilane or silazane, or the silane coupling agent C according to the present invention in an organic solvent such as ethanol, propanol, butanol, or 2,2,2-trifluoroethanol at a desired concentration to prepare a coating liquid for forming an intermediate layer, and then applying the coating liquid onto the base layer by a wet coating method and drying the coating liquid.

The concentration of the material for forming inorganic oxide in the coating liquid for forming an intermediate layer is not particularly limited, but is generally in the range of 0.5 to 50% by mass, and preferably in the range of 1.0 to 30% by mass.

The layer thickness of the intermediate layer according to the present invention is in the range of 0.5 to 500 nm, preferably in the range of 1 to 300 nm, and more preferably in the range of 5 to 100 nm.

(Liquid Repellent Layer)

In the present invention, the liquid repellent layer contains a silane fluorine (F)-containing coupling agent B.

The silane fluorine (F)-containing coupling agent B applicable to the liquid repellent layer according to the present invention is not particularly limited, but it is preferable that the liquid repellent layer contains a fluorine-based compound, and the fluorine-based compound contains: (1) a compound having a perfluoroalkyl group containing at least an alkoxysilyl group, a phosphonic acid group or a hydroxy group, or a compound having a perfluoropolyether group containing an alkoxysilyl group, a phosphonic acid group or a hydroxy group; or (2) a mixture containing a compound having a perfluoroalkyl group, or a mixture containing a compound having a perfluoropolyether group.

Specific examples of the fluorine (F)-containing coupling agent B applicable to the liquid repellent layer according to the present invention include chlorodimethyl[3-(2,3,4,5,6-pentafluorophenyl)propyl]silane, pentafluorophenyldimethylchlorosilane, pentafluorophenylethoxydimethylsilane, pentafluorophenylethoxydimethylsilane, trichloro(1H,1H,2H,2H-tridecafluoro-n-octyl)silane, trichloro(1H,1H,2H,2H-heptadecafluorodecyl)silane, trimethoxy(3,3,3-trifluoropropyl)silane, triethoxy(1H,1H,2H,2H-nonafluorohexyl)silane, triethoxy-1H,1H,2H,2H-heptadecafluorodecylsilane, trimethoxy(1H,1H,2H,2H-heptadecafluorodecyl)silane, trimethoxy(1H,1H,2H,2H-nonafluorohexyl)silane, trichloro[3-(pentafluorophenyl)propyl]silane, trimethoxy(11-pentafluorophenoxyundecyl)silane, triethoxy[5,5,6,6,7,7,7-heptafluoro-4,4-bis(trifluoromethyl)heptyl]silane, trimethoxy(pentafluorophenyl)silane, triethoxy(1H,1H,2H,2H-nonafluorohexyl)silane, and γ-glycidylpropyltrimethoxysilane.

Further, the fluorine (F)-containing silane coupling agent include those also commercially available, and examples thereof include those obtainable easily from Toray Dow Corning Silicone Co., Ltd., Shin-Etsu Chemical Co., Ltd., Daikin Industries Co., Ltd. (e.g., OPTOOL DSX), Asahi Glass Co., Ltd. (e.g., CYTOP), CEKO, Inc. (e.g., Top CleanSafe®), and FLUORO TECHNOLOGY Co., Ltd. (e.g., FLUOROSARF), Gelest Inc. and Solvay Solexis, Inc. (e.g., Fluorolink S10), and examples thereof further include compounds described in: J. Fluorine Chem., 79(1). 87(1996), Materials Technologies, 16(5), 209 (1998), Collect. Czech. Chem. Commun., 44, 750-755, J. Amer. Chem. Soc., 1990, 112, 2341-2348, Inorg. Chem., 10, 889-892, 1971, U.S. Pat. No. 3,668,233. Alternatively, these may be prepared by the synthetic methods or similar methods described in JP 558-122979A, JP H7-242675A, JP H9-61605A, JP H11-29585A, JP 2000-64348A, and JP 2000-144097.

Specific examples of the compound having a silane group-terminated perfluoropolyether group include "OPTOOL DSX" manufactured by Daikin Industries, Ltd., and a compound having a silane group-terminated fluoroalkyl group described above, for example, "FG-5010Z130-0.2" manufactured by FLUORO TECHNOLOGY Co., Ltd. Examples of the polymer having a perfluoroalkyl group include "SF Coat Series" manufactured by AGC Seimi Chemical Co., Ltd., and examples of the polymer having a fluorine-containing heterocyclic structure in the main chain include "CYTOP" manufactured by Asahi Glass Co., Ltd. Further, examples thereof also include a mixture of FEP (4 ethylene fluoride-6 propylene fluoride copolymer) dispersion and a polyamideimide resin.

As a method of forming the liquid repellent layer by the PVD method, it is preferable to use Evaporation substances WR1 and WR4 manufactured by Merck Japan Co., Ltd., which is a fluoroalkylsilane mixed oxide, as a fluorine-based compound, and to previously form a silicon oxide layer as a base layer or an adhesion layer as a ground, for example, when a liquid repellent layer by WR1 is formed on a silicon substrate. The liquid repellent layer formed by WR1 and WR4 exhibits liquid repellency to an organic solvent such as an alcohol including ethanol, ethylene glycol (including polyethylene glycol), a thinner, and a coating material in addition to water.

The layer thickness of the liquid repellent layer according to the present invention is generally in the range of 1 to 500 nm, preferably in the range of 1 to 400 nm, and more preferably in the range of 2 to 200 nm.

(Forming Method for Each Constituent Layer)

As a forming method for the base layer, the intermediate layer, the liquid repellent layer described above on the substrate, a thin film forming method such as a wet method or a dry method may be appropriately selected in accordance with the characteristics of the material used for forming each constituent layer.

The method for forming each constituent layer is not particularly limited, and examples of the wet method include spin coating, casting, microgravure coating, gravure coating, bar coating, roll coating, wire bar coating, dip coating, spray coating, screen printing, flexographic printing, offset printing, and inkjet printing.

Further, examples of the dry method include: (1) physical vapor deposition (PVD), for example, resistance heating type vacuum deposition, electron beam heating type vacuum deposition, ion plating method, ion beam assisted vacuum deposition, and sputtering method; and (2) chemical vapor deposition (CVD), for example, plasma CVD, thermal CVD, organometallic CVD, and photo CVD.

[Processing of Nozzle Plate]

In order to mount the plate-shaped nozzle plate manufactured according to the nozzle plate manufacturing method of the present invention on an inkjet head or the like, processing such as forming a nozzle hole for ejecting ink is performed.

As for a specific method for forming a nozzle hole or the like in the nozzle plate of the present invention, reference can be made to methods described in JP 2007-152871A, JP 2007-313701A, JP 2009-255341A, JP 2009-274415A, JP 2009-286036A, JP 2010-023446A, JP 2011-011425A, JP 2013-202886A, JP 2018-083316A, JP 2018-111208A, and the like, and detailed description thereof will be omitted.

<<Inkjet Head>>

Figure 3:
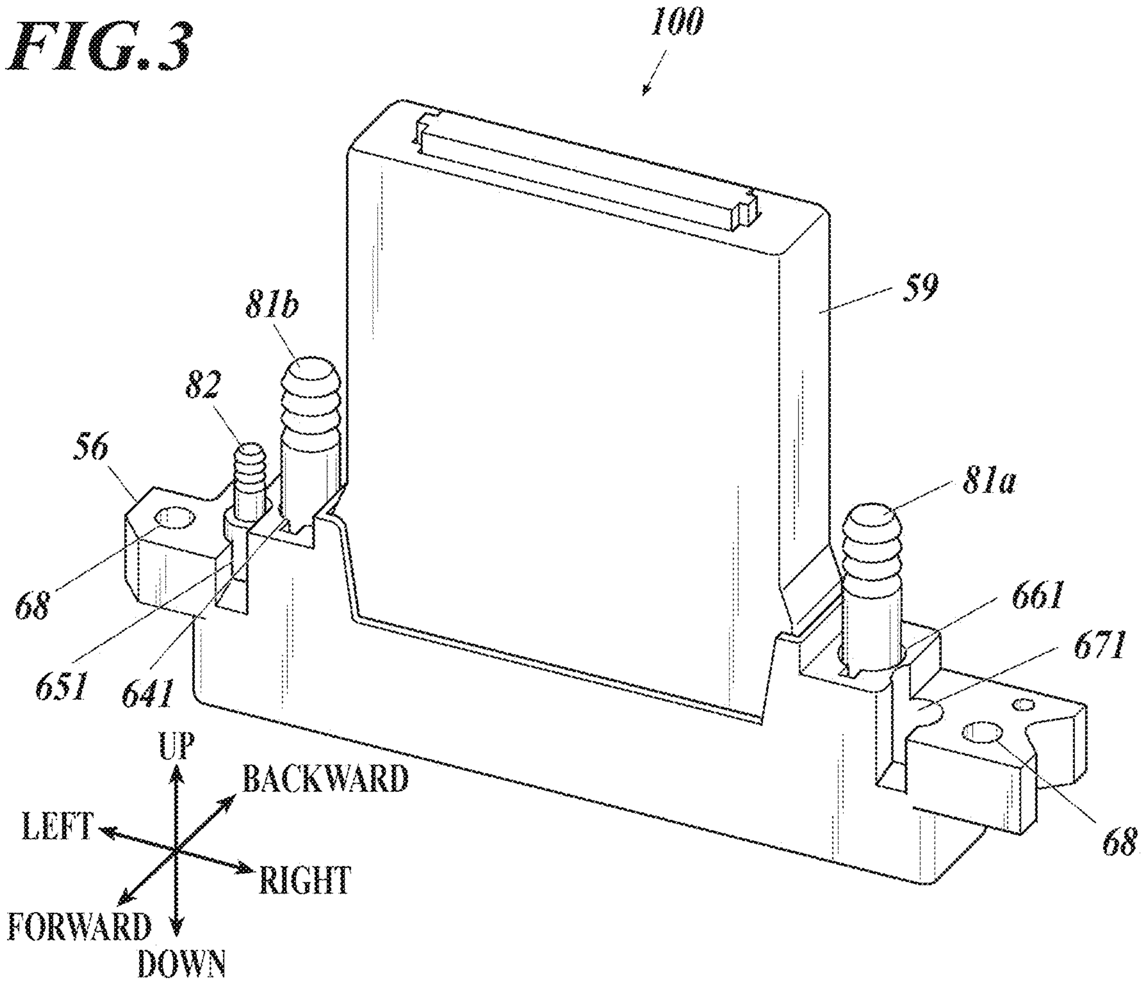
FIG. 3 is a schematic perspective view showing an example of a configuration of an inkjet head applicable to the nozzle plate of the present invention.

FIG. 3 is a schematic external view showing an example of a configuration of an inkjet head to which the nozzle plate of the present invention may be applied. Further, FIG. 4 is a bottom view of an inkjet head provided with the nozzle plate of the present invention.

As shown in FIG. 3, the inkjet head 100 provided with the nozzle plate of the present invention is intended to be mounted on an inkjet printer (not shown). The inkjet head 100 is provided with a head chip for ejecting ink from the nozzle, a wiring board in which the head chip is disposed, a drive circuit board connected through the flexible substrate to the wiring board, a manifold for introducing ink through a filter to the channel of the head chip, a housing 56 in which the manifold is housed, a cap receiving plate mounted so as to close the bottom opening of the housing 56, first and second joints 81*a* and 81*b* attached to the first ink port and the second ink port of the manifold, a third joint 82 attached to the third ink port of the manifold, and a cover member 59 attached to the housing 56. Further, mounting holes 68 for mounting the housing 56 on the printer main body side are respectively formed.

Figure 4:
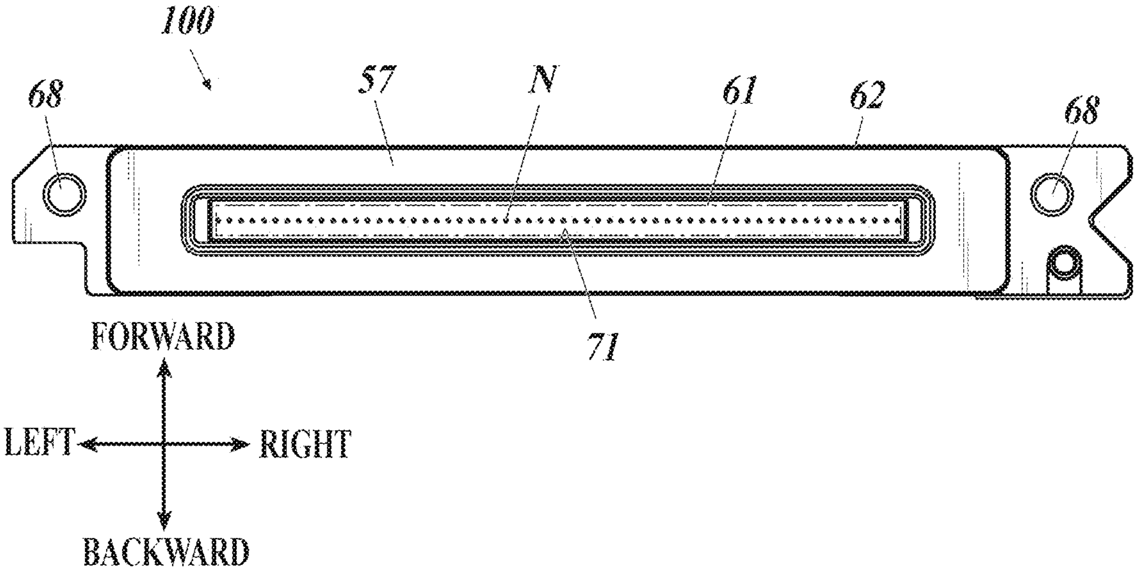
FIG. 4 is a bottom view showing an example of a nozzle plate constituting the inkjet head shown in FIG. 3.

Further, the cap receiving plate 57 shown in FIG. 4 is formed in a substantially rectangular plate shape having an outer shape elongated in the left-right direction in correspondence with the shape of the cap receiving plate attachment portion 62, and is formed in a substantially central portion thereof, and in order to expose the nozzle plate 61 on which the plurality of nozzle holes N are arranged, an elongated nozzle opening 71 is provided in the left-right direction. Further, with respect to the specific configuration of the inside of the inkjet head shown in FIG. 4 for example, it is possible to refer to FIG. 2 described in JP 2012-140017A.

Although a typical example of an inkjet head is shown in FIGS. 3 and 4, an inkjet head having a constitution described in, for example, JP 2012-140017A, JP 2013-010227A, JP 2014-058171A, JP 2014-097644A, JP 2015-142979A, JP 2015-142980A, JP 2016-002675A, JP 2016-002682A, JP 2016-107401A, JP 2017-109476A, and JP 2017-177626A may be appropriately selected and applied.

<<Inkjet Ink>>

There is no particular limitation on the inkjet ink applicable to the inkjet recording method using the inkjet head of the present invention, and for example, there are various types of inkjet inks, such as an aqueous inkjet ink containing water as a main solvent, an oil-based inkjet ink containing a nonvolatile solvent not volatilized at room temperature and substantially free of water, an organic solvent-based inkjet ink containing a solvent volatilized at room temperature and substantially free of water, a hot melt ink which is printed by heating and melting a solid ink at room temperature, and an active energy ray-curable inkjet ink which is cured by an active ray such as ultraviolet rays after printing, but in the present invention, an alkaline ink is preferably applied in view of exerting the effects of the present invention.

The ink includes, for example, an alkaline ink and an acidic ink, and in particular, the alkaline ink may cause chemical deterioration of a liquid repellent layer and a nozzle forming surface, and it is particularly effective to apply the inkjet head provided with the nozzle plate of the present invention to an inkjet recording method using such an alkaline ink.

Specifically, the ink applicable to the present invention includes a coloring material such as a dye or a pigment, water, a water-soluble organic solvent, a pH adjuster, and the like. Examples of the water-soluble organic solvent that can be used include ethylene glycol, propylene glycol, diethylene glycol, dipropylene glycol, glycerin, triethylene glycol, ethanol, and propanol. Examples of the pH adjuster that can be used include sodium hydroxide, potassium hydroxide, sodium acetate, sodium carbonate, sodium bicarbonate, alkanolamine, hydrochloric acid, and acetic acid.

In a case where sodium hydroxide, potassium hydroxide, sodium acetate, sodium carbonate, sodium bicarbonate, alkanolamine, or the like is used as the pH adjuster, the ink is alkaline, and becomes alkaline ink (liquid) which may cause chemical damage (chemical deterioration) of the liquid repellent layer or the nozzle forming surface. Alkaline ink has a pH of 8.0 or more.

As described above, the liquid repellent layer is formed of a fluorine-containing silane coupling agent or the like. The liquid repellent layer has a structure in which a partial structure containing silicon and a partial structure containing fluorine are bonded by substituents such as a methylene group ($CH_2$). Since the bond energy between carbon (C) and carbon (C) is smaller than the bond energy between silicon (Si) and oxygen (O) and the bond energy between carbon (C) and fluorine (F), the portion where carbon (C) and carbon (C) are bonded is weaker than the portion where silicon (Si) and oxygen (O) are bonded and the portion where carbon (C) and fluorine (F) are bonded, and is easily affected by mechanical damage or chemical damage.

In an inkjet recording method using alkaline ink, which tends to cause such a phenomenon, it is effective to apply the nozzle plate having a constitution specified in the present invention in terms of improving the durability.

EXAMPLES

Hereinafter, the present invention will be specifically described by way of Examples, but the present invention is not limited thereto. In the examples, "parts" or "%" is used, but unless otherwise specified, it indicates "parts by mass" or "% by mass". Each operation was performed at room temperature (25° C.) unless otherwise specified.

<<Production of Nozzle Plate>>

[Production of Nozzle Plate 1]

A nozzle plate 1 constituted by the substrate 2, the base layer 3, the intermediate layer 4, and the liquid repellent layer 5 shown in FIG. 1 was produced according to the following method.

(1) Preparation of Substrate

A stainless steel substrate (SUS 304) of 3 cm in length, 8 cm in width and 50 μm in thickness without surface treatment was used as a substrate. The maximum height Rz of the stainless steel substrate was measured by means of a non-contact type three dimension microscopic surface configuration measuring system RSTPLUS produced by WYKO Corporation in conformity with JIS B 0601:2001 at 25° C. and 55% RH, and was found to be 120 nm.

(2) Formation of First Layer (Base Layer)

(Preparation of Coating Liquid 1 for Forming Base Layer)

<Preparation of A-1 Liquid>

A liquid A-1 was prepared by mixing the following constituent materials.

| | |
|---|---|
| Mixed solution of ethanol and 2,2,2-trifluoroethanol (8:2 by volume) | 30 mL |
| Silane coupling agent a: 1,4-bis(trimethoxysilylethyl)benzene ($(CH_3O)_3Si(CH_2)_2(C_6H_4)(CH_2)_2Si(OCH_3)_3$) | 2 mL |

<Preparation of A-2 Liquid>

| | |
|---|---|
| Mixed solution of ethanol and 2,2,2-trifluoroethanol (8:2 by volume) | 19.5 mL |
| Pure water | 30 mL |
| Hydrochloric acid (36% by volume) | 0.5 mL |

(Formation of Base Layer)

While stirring the prepared A-1 solution with a stirrer, 5 mL of the A-2 solution was added dropwise. After stirring for about 1 hour after the dropwise addition, the mixed solution was applied onto a substrate by spin coating under the condition that the layer thickness of the base layer after drying was 100 nm. The conditions for spin coating were 5000 rpm for 20 seconds. Thereafter, the substrate was dried at room temperature for 1 hour and then calcined at 200° C. for 30 minutes.

(3) Formation of Second Layer (Intermediate Layer)

(Preparation of Coating Liquid 1 for Forming Intermediate Layer)

A coating liquid 1 for forming an intermediate layer was prepared by mixing the following constituent materials.

| | |
|---|---|
| Mixed solution of ethanol and 2,2,2-trifluoroethanol (8:2 by volume) | 69 mL |
| Pure water | 30 mL |
| Silane coupling agent c: 3-aminopropyltriethoxysilane ($(C_2H_5O)_3SiC_3H_6NH_2$), KBE-903 manufactured by Shin-Etsu Chemical Co., Ltd.) | 1 mL |

(Formation of Intermediate Layer)

The coating liquid 1 for forming an intermediate layer (KBE-903 concentration:1.0% by volume) prepared as described above was applied onto the base layer of the substrate by spin coating under the condition that the layer thickness of the intermediate layer after drying was 20 nm. The conditions for spin coating were 3000 rpm for 20 seconds. Thereafter, the substrate was dried at room temperature for 1 hour, and then subject to a heat treatment at 90° C. and 80% RH for 1 hour.

(4) Formation of Third Layer (Liquid Repellent Layer)

(Preparation of Coating Liquid 1 for Forming Liquid Repellent Layer)

A coating liquid 1 for forming a liquid repellent layer was prepared by mixing the following constituent materials.

| | |
|---|---|
| Mixed solution of ethanol and 2,2,2-trifluoroethanol (8:2 by volume) | 69.8 mL |
| Pure water | 30 mL |
| Fluorine-containing coupling agent b: (2-perfluorooctyl)ethyltrimethoxysilane ($CF_3(CF_2)_7C_2H_4Si(OCH_3)_3$) | 0.2 mL |

(Formation of Liquid Repellent Layer)

The coating liquid 1 for forming a liquid repellent layer containing 0.2% by volume of the coupling agent b containing a fluorine atom prepared as described above was applied onto the intermediate layer formed as described above by spin coating under the condition that the layer thickness of the liquid repellent layer after drying is 10 nm. The conditions for spin coating were 1000 rpm for 20 seconds. Thereafter, the substrate was dried at room temperature for 1 hour, and then subject to a heat treatment at 90° C. and 80% RH for 1 hour.

[Formula 1]

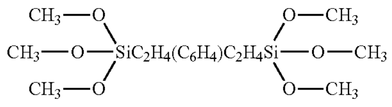

Silane coupling agent a

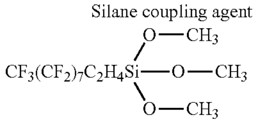

Fluorine-containing coupling agent b

[Production of Nozzle Plate 2]

A nozzle plate 2 was produced in the same manner as in the production of the nozzle plate 1 except that the layer thickness of the base layer was changed to 140 nm at 3000 rpm for 20 seconds as a forming condition using spin coating.

[Production of Nozzle Plate 3]

A nozzle plate 3 was produced in the same manner as in the production of the nozzle plate 2 except that the surface of the SUS substrate was subjected to a passivation treatment according to the following method.

(Passivation Treatment of SUS Substrate)

A stainless steel substrate (SUS 304) was subjected to acid treatment by immersing in a nitric acid solution to form a passivation film having a thickness of 30 nm on the surface. The maximum height Rz of the stainless steel substrate was 110 nm.

[Production of Nozzle Plate 4]

A nozzle plate 4 was produced in the same manner as in the production of the nozzle plate 3 except that the first layer (base layer) was not formed.

[Production of Nozzle Plate 5]

A nozzle plate 5 was produced in the same manner as in the production of the nozzle plate 3 except that the second layer (intermediate layer) was not formed.

[Production of Nozzle Plate 6]

A nozzle plate 6 constituted by the substrate 2 and the liquid repellent layer 5 alone was produced according to the following method.

(1) Preparation of Substrate

A stainless steel substrate (SUS 304) of 3 cm in length, 8 cm in width and 50 μm in thickness without surface treatment was used as a substrate.

(2) Formation of Third Layer (Liquid Repellent Layer)

(Preparation of Coating Liquid a for Forming Liquid Repellent Layer)

A coating liquid A for forming a liquid repellent layer was prepared by mixing the following constituent materials.

| | |
|---|---|
| Mixed solution of ethanol and 2,2,2-trifluoroethanol (8:2 by volume) | 30 mL |
| Silane coupling agent a: 1,4-bis(trimethoxysilylethyl)benzene ($(CH_3O)_3Si(CH_2)_2(C_6H_4)(CH_2)_2Si(OCH_3)_3$) | 2 mL |
| Fluorine-containing coupling agent b: (2-perfluorooctyl)ethyltrimethoxysilane ($CF_3(CF_2)_7C_2H_4Si(OCH_3)_3$) | 0.2 mL |

(Preparation of Coating Liquid B for Forming Liquid Repellent Layer)

| | |
|---|---|
| Mixed solution of ethanol and 2,2,2-trifluoroethanol (8:2 by volume) | 19.5 mL |
| Pure water | 30 mL |
| Hydrochloric acid (36% by volume) | 0.5 mL |

(Formation of Liquid Repellent Layer)

While stirring the coating liquid A for forming a liquid repellent layer with a stirrer, 5 mL of the coating liquid B for forming a liquid repellent layer was added dropwise. After stirring for about 1 hour after the dropwise addition, the solution was applied onto a SUS substrate by spin coating under the condition that the thickness after drying was 140 nm. The conditions for spin coating were 3000 rpm for 20 seconds. Thereafter, the base material was dried at room temperature for 1 hour and then calcined at 200° C. for 30 minute to produce a nozzle plate 6.

<<Evaluation of Nozzle Plate>>

The following evaluations were performed on each of the nozzle plates produced above.

[Evaluation of Initial Liquid Repellency]

(Preparation of Aqueous Alkaline Dummy Ink for Evaluation)

In an aqueous alkaline dummy ink having pH 9, a buffer solution such as sodium carbonate or potassium carbonate was mixed and adjusted to pH 9. This dummy ink is an aqueous solution containing ethylene glycol in an amount of 50% by mass.

(Measurement of Receding Contact Angle)

Using a contact angle meter model CA-X manufactured by Kyowa Interface Science Co., Ltd., the dummy ink as a test liquid was sucked onto the surface of the liquid repellent layer formed on the nozzle plate under conditions of initial droplet volume of 15 μL and suction speed of 5 μL/sec using an attached macrosyringe under an environment of 25° C. and 50% RH, and the contact angle when the ink droplet volume was reduced by suction was measured and taken as a receding contact angle θ1, and the initial liquid repellency was evaluated in accordance with the following criteria.

AA: The receding contact angle θ1 is 50° or more

BB: The receding contact angle θ1 is 40° or more and less than 50°

CC: The receding contact angle θ1 is 300 or more and less than 40°

DD: The receding contact angle θ1 is 100 or more and less than 30°

EE: The receding contact angle θ1 is less than 10°

[Evaluation of Alkali Resistance]

Each nozzle plate of 3 cm in length and 5 cm in width was immersed in the aqueous alkaline dummy ink for evaluation (pH 9) at 25° C. and stored for 30 days, and then the receding contact angle was measured by the same method as described above to evaluate alkali resistance.

[Evaluation of Abrasion Resistance (Wiping Resistance)]

(Preparation of Black Ink)

A black ink for evaluation having the following constitution was prepared.

<Preparation of Black Pigment Dispersion>

| | |
|---|---|
| C. I. Pigment Black 6 | 12 g |
| PB822 (manufactured by Ajinomoto Fine-Techno Co., Inc.) | 5 g |
| Isopropyl methyl sulfone | 5 g |
| Triethylene glycol monobutyl ether | 68 g |
| Ethylene glycol diacetate | 10 g |

The above components were mixed and dispersed by a horizontal bead mill in which 0.3 mm zirconia beads were filled with 60% by volume to obtain a black pigment dispersion. The average particle size was 125 nm.

<Preparation of Black Ink>

| | |
|---|---|
| Black pigment dispersion | 33 g |
| Ethylene glycol monobutyl ether | 57 g |
| Triethylene glycol monomethyl ether acetate | 6.7 g |
| N-methyl-2-pyrrolidone | 3.3 g |
| (Wiping test) | |

In a container containing the black ink prepared above at 25° C., each nozzle plate was fixed by a fixing jig with the liquid repellent layer facing upward, and 1000 wiping operations were performed on the surface of the liquid repellent layer of the nozzle plate by using a wiper blade made of ethylene propylene diene rubber.

Next, the receding contact angle was measured by the same method as described above, and the abrasion resistance was evaluated.

The evaluation results obtained as described above are shown in Table I.

TABLE 1

| Nozzle plate No. | Substrate: Material | Substrate: Surface treatment | Substrate: Maximum height Rz (nm) | First layer Base layer: Material | First layer Base layer: Layer thickness (nm) | Second layer Intermediate layer | Third layer Liquid repellent layer | Evaluation results: Initial liquid repellency | Evaluation results: Alkali resistance | Evaluation results: Abrasion resistance | Remarks |
|---|---|---|---|---|---|---|---|---|---|---|---|
| 1 | SUS | — | 120 | *1 | 100 | *2 | *3 | AA | BB | BB | Present Invention |
| 2 | SUS | — | 120 | *1 | 140 | *2 | *3 | AA | AA | BB | Present Invention |
| 3 | SUS | Passivation film | 110 | *1 | 140 | *2 | *3 | AA | AA | AA | Present Invention |
| 4 | SUS | Passivation film | 110 | — | — | *2 | *3 | AA | BB | EE | Comparative Example |
| 5 | SUS | Passivation film | 110 | *1 | 140 | — | *3 | BB | DD | DD | Comparative Example |
| 6 | SUS | Passivation film | 110 | — | — | — | *1 + *3 | BB | CC | DD | Comparative Example |

*1: Silane coupling agent a
*2: Silane coupling agent b
*3: Fluorine-containing coupling agent b As shown in Table I, it can be seen that the nozzle plate having the constitution specified in the present invention is superior to Comparative Examples in terms of ink repellent effect on the surface of the liquid repellent layer, and that even when exposed to an alkaline ink component for a long period of time or subjected to a stress on the surface, the base layer acts as a stress relaxation layer, and that the bonding between each constituent layers is high, and alkali resistance and abrasion resistance are superior.

INDUSTRIAL APPLICABILITY

The nozzle plate of the present invention exhibits excellent abrasion resistance, alkali ink resistance, liquid repellency, and can be suitably used for an inkjet printer using inks in various fields.

REFERENCE SIGNS LIST

1 Nozzle plate
2 Substrate
3 Base layer
4 Intermediate layer
5 Liquid repellent layer
6 Passivation film
56 Housing
57 Cap receiving plate
59 Cover member
61 Nozzle plate
62 Cap receiving plate attachment portion
68 Mounting hole
71 Nozzle opening
81*a* First joint
81*b* Second joint
82 Third joint
100 Inkjet head
N Nozzle

The invention claimed is:

1. A nozzle plate comprising, on a substrate: at least a base layer; an intermediate layer; and a liquid repellent layer, wherein the base layer contains a silane coupling agent A having reactive functional groups at both terminals and including a hydrocarbon chain and a benzene ring at an intermediate part;

the intermediate layer contains an inorganic oxide; and the liquid repellent layer contains a fluorine (F)-containing coupling agent B;

wherein the silane coupling agent A contained in the base layer is a compound having a structure represented by the following general formula (1):

$$X_5Q_{3-s}Si(CH_2)_tC_6H_4(CH_2)_uSiR_{3-m}X_m \quad \text{General formula (1)}$$

wherein Q and R each represent a methyl group or an ethyl group, t and u each represent a natural number of 1 to 10, and s and m each represent a natural number of 1 to 3; when s is 1 and m is 1, two Q and two R are present, and the two Q and R each have the same structure or different structures; $C_6H_4$ is a phenylene group; and X represents an alkoxy group, a chlorine, an acyloxy group, or an amino group.

2. The nozzle plate according to claim 1, wherein the inorganic oxide contained in the intermediate layer is an inorganic oxide containing carbon (C), silicon (Si), and oxygen (O) as main components.

3. The nozzle plate according to claim 2, wherein the inorganic oxide containing carbon (C), silicon (Si), and oxygen (O) as main components and forming the intermediate layer is a silane compound or a silane coupling agent C having a molecular weight of 300 or less.

4. The nozzle plate according to claim 1, wherein the substrate is a metal and a surface of the metal has a passivation film.

5. The nozzle plate according to claim 1, wherein the substrate is stainless steel.

6. The nozzle plate according to claim 1, wherein when a film thickness of the base layer is defined as t (μm) and a maximum height in surface roughness of the substrate is defined as Rz (μm), a condition defined by the following formula (1) is satisfied:

$$Rz \le t. \quad \text{Formula (1)}$$

7. A nozzle plate manufacturing method for manufacturing the nozzle plate according to claim 1, comprising:

forming the nozzle plate by forming at least a base layer, an intermediate layer, and a liquid repellent layer on a substrate, wherein the base layer is formed by using a silane coupling agent A having reactive functional groups at both terminals and including a hydrocarbon chain and a benzene ring at an intermediate part;

the intermediate layer is formed of an inorganic oxide; and the liquid repellent layer is formed by using a fluorine (F)-containing coupling agent B.

8. The nozzle plate manufacturing method according to claim 7, wherein a passivation treatment is performed on a surface of the substrate to form a passivation film.

9. The nozzle plate manufacturing method according to claim 8, wherein a film thickness of the passivation film is in a range of 10 to 100 nm.

10. An inkjet head comprising the nozzle plate according to claim 1.

* * * * *